UNITED STATES PATENT OFFICE.

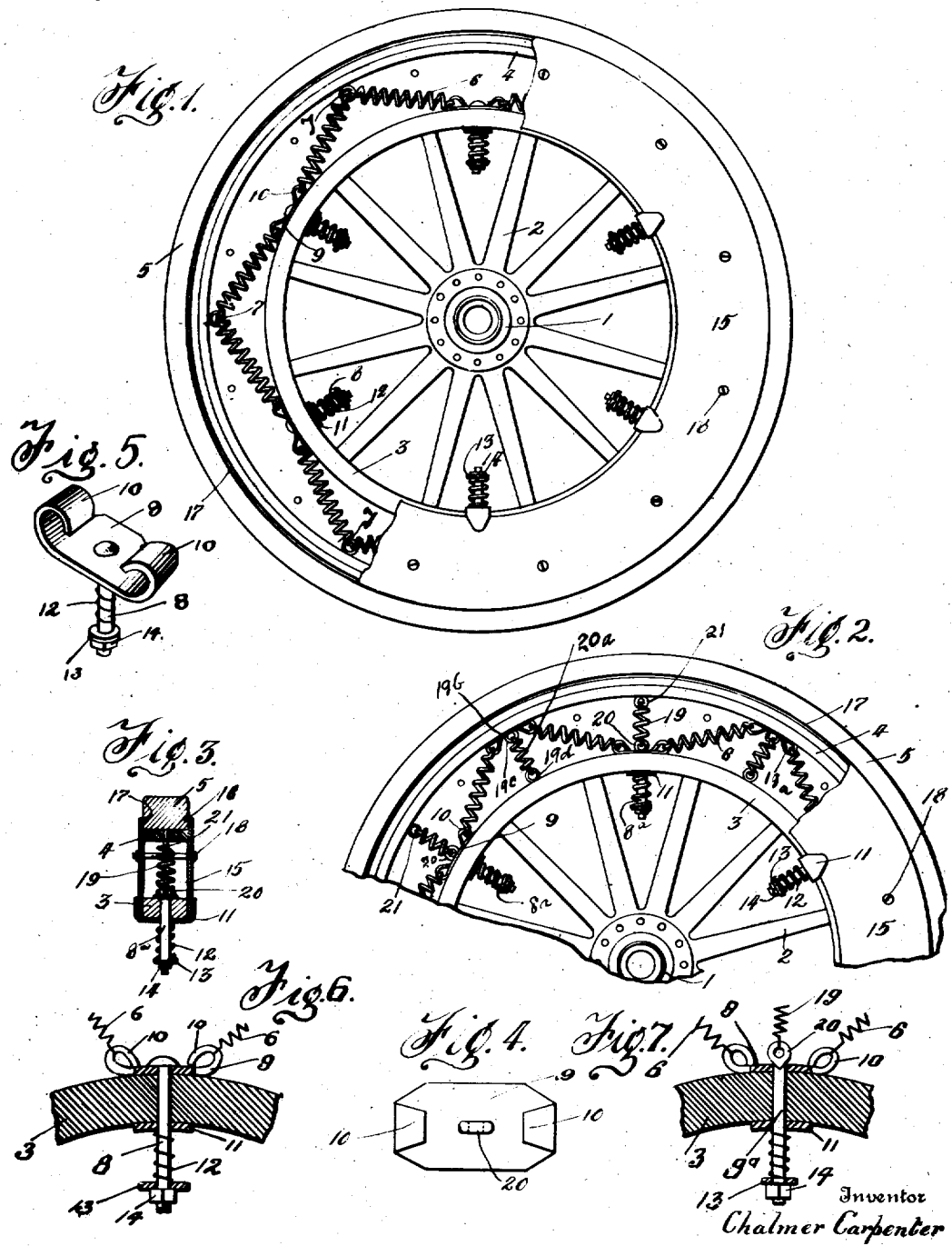

CHALMER CARPENTER, OF PITTSBURG, PENNSYLVANIA.

WHEEL.

973,916.  Specification of Letters Patent.  Patented Oct. 25, 1910.

Application filed January 22, 1909. Serial No. 473,757.

*To all whom it may concern:*

Be it known that I, CHALMER CARPENTER, a citizen of the United States of America, residing at Pittsburg, in the county of Allegheny and State of Pennsylvania, have invented certain new and useful Improvements in Wheels, of which the following is a specification, reference being had therein to the accompanying drawing.

This invention relates to wheels, and the objects of my invention are, first, to provide a novel wheel wherein resilient means are employed for cushioning the hub portion thereof; second, to obviate the necessity of using springs beneath the body of a vehicle; third, to provide a durable and inexpensive wheel that will insure easy riding to the occupants of a vehicle; and fourth, to provide a wheel that can be advantageously used in connection with automobiles, baby carriages and similar vehicles.

I attain the above objects by providing a wheel with an auxiliary rim and arranging between said rim and the tire of the wheel a plurality of equally spaced springs for resiliently supporting the inner rim relative to the outer rim, whereby jarring of the hub of the wheel incurred by the wheel passing over rough and irregular roads or streets will be reduced to a minimum.

The detail construction entering into my invention will be hereinafter described in detail and then claimed.

Referring to the drawings:—Figure 1 is an elevation of my wheel partly broken away and partly in section, Fig. 2 is an elevation of a portion of a wheel of a modified form of construction, Fig. 3 is a cross sectional view of the same. Fig. 4 is a plan of the form of tie plate employed in the construction shown in Fig. 1. Fig. 5 is a perspective view of said tie plate. Fig. 6 is a sectional detail showing the arrangement of the tie plate, and Fig. 7 is a sectional detail showing the form of tie plate employed in the construction shown in Fig. 2.

In the accompanying drawings, 1 designates a hub having a plurality of radially disposed spokes 2 connected by an inner rim or felly 3. Surrounding the inner rim 3 and of greater diameter than the rim 3 is an outer rim 4 having a tire 5. The inner rim 3 is connected to the outer rim 4 by a plurality of angularly disposed coil springs 6, and the manner of connecting said springs to said rims is as follows: The inner side of the outer rim 4 is provided with a plurality of equally spaced eyelets 7, while the inner rim 3 is provided with a plurality of headed stationary bolts 8. Against the heads of the bolts abut tie plates 9, which plates are mounted against the outer face of the inner rim 3, said plates having the ends thereof bent to provide eyelets 10. The tie plates 9 are equally spaced upon the periphery of the rim 3 and intermediate the eyelets 7 of the outer rim 4, whereby the coil spring 6 can be equally distributed, and connected to the eyelets 7 and 10 to firmly support and cushion the inner rim 3, relative to the outer rim 4 from all points during the rotation of the wheel. The bolts 8 are radially disposed, and are provided with clips 11 embracing the inner rim 3. The heads of the bolts 8 being firmly secured against the plates 9 by reason of the securing of the bolts in the inner rim, the clips 11 are resiliently normally maintained against the inner rim 3 by coil springs 12 which are mounted upon the bolts and interposed between the clips 11 and washers 13. These latter are mounted upon the bolts and supported by the nuts 14 secured to the screw-threaded ends of the bolts 8. The nuts 14 not only provide a support for the washers 13, but further constitute means whereby the tension of the springs 12 can be adjusted as well as hold the springs 12 under a state of tension.

The clips 11 embrace and resiliently support circular side plates 15, having the outer edges thereof bent inwardly to provide flanges 16 adapted to engage in circumferential grooves 17, formed in the sides of the tire 5. Said spring-pressed clips 11 perform the dual function of assisting the resilient action of the wheel and the holding of the plates 15 from separating and in contact with the opposite sides of the inner rim. The plates 15 are connected by a plurality of circumferentially arranged tie rods 18.

It will be observed that the springs 6 are of V-shaped arrangement, adapted to fully support the inner rim 3. To provide for the use of the wheel in connection with heavy vehicles, additional springs are employed, the said springs are radially disposed and are indicated by the reference character 19 and are clearly shown in Fig. 2. The bolts used for connecting the tie plates to the inner rim 3 for the form of wheel shown in Fig. 2 are slightly modified, said modified bolts are indicated by the reference character 8a and in lieu of providing the bolts with heads similar to the heads of the bolts 8, each of the bolts 8a is provided with an eyelet 20 in lieu of a head. The outer rim 4 is provided with eyelets 21 which oppose the eyelets 20 and to each eyelet 20 and the opposing eyelet 21 a spring 19 is secured. In Fig. 2 in lieu of connecting the outer ends of the springs 6 to eyelet 7, the said ends of the springs are connected to eyelets 19a formed on the plates 19b secured to the inner face of the outer rim 4 by hold fast devices which project into the space formed between the rims 3 and 4 and have the projecting ends thereof formed with eyes 19c, the said eyes 19c oppose eyelets 19d carried by the rim 3. The eyes 19c and 19d are connected together by radially disposed springs 20a. The springs 19 and 20a are equally spaced throughout the wheel at intervals and are what may be termed auxiliary spokes.

The plates 15 are adapted to protect the springs 6 and 19 from being injured by flying stones, also to prevent the space between the inner and outer rims from becoming clogged with mud.

The tire 5 can be made of rubber, or metal according to the vehicle in connection with which the wheel is used, and while in the drawings forming a part of this application, I have illustrated the preferred embodiments of my invention, I would have it understood that the details of construction can be varied or changed as to the shape, proportion and manner of assemblage without departing from the spirit of the invention.

Having now described my invention what I claim as new, is:—

1. A wheel comprising a hub, radially disposed spokes carried thereby, an inner rim carried by said spokes, an outer rim surrounding said inner rim, a tire arranged upon said outer rim, bolts arranged in said inner rim, tie plates carried by said bolts upon the periphery of said inner rim, a plurality of equally spaced eyelets carried by said outer rim, coil springs arranged between said eyelets and said tie plates, coil springs encircling said bolts upon the inner side of said inner rim, clips carried by said bolts, side plates held by said clips and having the upper edges thereof extending into said tire, and tie rods connecting said plates, substantially as described.

2. A wheel comprising a hub, radially disposed spokes carried thereby, an inner rim carried by said spokes, an outer rim surrounding said inner rim, coil springs connecting said inner rim with said outer rim, bolts upon said inner rim, clips slidably mounted upon said bolts and embracing said inner rim, springs connecting said bolts and clips, side plates held by said clips and having the outer edges thereof embracing said outer rim, and tie rods connecting said plates.

3. A wheel of the type described, comprising an inner rim, an outer rim surrounding said inner rim, bolts arranged in said inner rim, tie plates carried by said bolts upon the periphery of said inner rim, coil springs connecting said outer rims with said tie plates, clips carried by said bolts, side plates partially supported by said clips, and means mounted upon said bolts for retaining said plates in engagement with said inner rim.

In testimony whereof I affix my signature in the presence of two witnesses.

CHALMER CARPENTER.

Witnesses:
K. H. BUTLER,
MAX H. SROLOVITZ.